United States Patent [19]
Ashby

[11] Patent Number: 5,975,839
[45] Date of Patent: Nov. 2, 1999

[54] DISK SINGULATING APPARATUS

[76] Inventor: Harrel Dean Ashby, 11913 Rosemeade Ct., Oklahoma City, Okla. 73162

[21] Appl. No.: 08/968,533

[22] Filed: Nov. 12, 1997

[51] Int. Cl.[6] .................................................. B65G 59/06
[52] U.S. Cl. .................................... 414/798.1; 414/797.8; 221/36; 221/223; 221/297
[58] Field of Search ............................. 414/797.4, 797.8, 414/798, 798.1, 941; 221/36, 37, 223, 297

[56] References Cited

U.S. PATENT DOCUMENTS

| | | | |
|---|---|---|---|
| 4,529,101 | 7/1985 | Orlowski | 221/223 |
| 4,644,427 | 2/1987 | Ashby | 360/98 |
| 5,050,023 | 9/1991 | Ashby | 360/98.06 |
| 5,383,571 | 1/1995 | Gunderson | 221/223 |
| 5,611,436 | 3/1997 | Ashby | 209/573 |
| 5,738,246 | 4/1998 | Chung | 221/297 |

FOREIGN PATENT DOCUMENTS

| | | | |
|---|---|---|---|
| 403272156 | 12/1991 | Japan | 414/941 |
| 1382553 | 3/1988 | U.S.S.R. | 414/797.8 |
| 8402575 | 7/1984 | WIPO | 414/797.8 |

Primary Examiner—Janice L. Krizek
Assistant Examiner—Douglas Hess
Attorney, Agent, or Firm—Dunlap, Codding & Rogers, P.C.

[57] ABSTRACT

An apparatus for discharging disks from the bottom of a stack of aligned disks one at a time is provided. The apparatus includes a pair of feed gate subassemblies supported in a spaced apart, diametrically opposing relationship so as to define a disk receiving opening therebetween. The feed gate subassemblies are adapted to cooperatively support the stack of disks in the disk receiving opening and abuttingly engage at least a portion of the outer peripheral edge of the disk positioned at the bottom of the stack of disks so as to compress the bottom disk and thus cause the bottom disk to be discharged from the stack of disks.

6 Claims, 6 Drawing Sheets

DISK SINGULATING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to optical disk handling devices, and more particularly, but not by way of limitation, to an apparatus for separating a single optical disk from the bottom of a stack of optical disks for the purpose of labeling, packaging, duplicating, inspecting, or performing other processing steps on the separated optical disk.

2. Brief Description of the Related Art

An optical disk is a storage medium that holds information in the form of a pattern of marks on a platter. An optical-disk drive in turn reads, erases, or writes data on the disk with a laser beam. Examples of optical disks include CD-Audio, CD-Video, CD-ROM, CD-R, WORM, DVD, and DVD-ROM. The use of optical disks for storing data has evolved rapidly in recent years and continues to evolve in that optical disks are able to store a large amount of information in a small space and optical disks are extremely durable with some types of optical disks expected to last many decades.

Optical disks are generally fabricated of a clear plastic base impressed on one side thereof with information. A reflective layer of aluminum, gold, or the like is then applied to the base and covered with a lacquer coating for protection. During the final stages of production, the disk is printed with graphics, inspected, and packaged.

In order to meet the high demand for optical disks, large numbers of optical disks must be rapidly produced. Therefore, devices have been designed to hold such disks in bulk and to individually feed the disks to various pieces of production equipment. Such devices typically include a robotic swing arm provided with a vacuum system which removes the optical disk positioned on the top of a stack of disks, delivers the removed disk to the processing equipment, and then returns to remove the next disk. While these types of devices have achieved varying degrees of success, their inherent complexity results in a device that is expensive to manufacture and requires a high degree of attention to maintain. In addition, by removing the disk from the top of the stack, operation of these devices must be periodically interrupted to replenish the supply of disks, or the device must be provided with a carousel mechanism adapted to hold multiple stacks of optical disks. To this end, it would be desirable to be able to separate the disk located at the bottom of the stack whereby one stack could be continually replenished without having to halt production.

Several devices have previously been proposed for removing a disk-like object from the bottom of a stack. One such device is disclosed in U.S. Pat. No. 5,050,023, issued to H. D. Ashby, the present inventor. The Ashby '023 patent discloses a mechanism for separating a floppy diskette from the bottom of a stack of floppy diskettes. The mechanism includes a pair of opposing feed subassemblies which function to position a pair of opposing, wedgeshaped ribs between the bottom diskette and the adjacent diskette so as to support the stack while allowing the bottom diskette to be released from the stack.

U.S. Pat. No. 5,611,436, issued to H. D. Ashby, discloses the use of a similar mechanism for separating a PC card from the bottom of a stack of PC cards.

While such mechanisms have successfully met the need for rapid and reliable handling of diskettes and PC cards, problems are encountered when attempting to employ the same mechanism for separating optical disks. It has been found that these problems stem from the structural differences between diskettes and PC cards relative to an optical disk. In addition to the obvious difference that diskettes and PC cards are square and rectangular in shape while an optical disk is circularly shaped, the outer peripheral edges of the jackets of diskettes and PC cards are slightly rounded. This results in a peripheral notch or indentation being formed between each diskette or PC card when the diskettes and PC cards are aligned in a stack. The formation of this notch provides an accessible space into which a wedge member can be easily inserted to separate adjacent diskettes or PC cards. In contrast, the outer peripheral edge of the plastic base of an optical disk is substantially squared relative to the opposing planar faces of the base. As such, when optical disks are arranged in a stack with the outer peripheral edges aligned, there is no readily accessible space provided between the optical disks into which a wedge device can be reliably inserted to separate adjacent optical disks.

To this end, a need exists for an apparatus which can separate an optical disk from the bottom of a stack of optical disks without affecting the integrity of the disk, and which has a minimum of moving parts to provide low cost maintenance while reliably handling large numbers of optical disks. It is to such an apparatus that the present invention is directed.

BRIEF SUMMARY OF THE INVENTION

The present invention is directed to an apparatus for discharging optical disks from the bottom of a stack of aligned optical disks one at a time. The apparatus includes a pair of feed gate subassemblies supported in a spaced apart, diametrically opposing relationship so as to define a disk receiving opening therebetween. The feed gate subassemblies are adapted to cooperatively support the stack of optical disks in the optical disk receiving opening and abuttingly engage at least a portion of the outer peripheral edge of the optical disk positioned at the bottom of the stack of optical disks so as to compress the bottom optical disk and thus cause the bottom optical disk to be discharged from the stack of optical disks.

Each feed gate subassembly includes a cylinder, a support flange, a clamp block, and a spring. Each cylinder has a piston slidably disposed therein so as to be adapted for reciprocating movement relative to the cylinder and a piston rod having one end connected to the piston so that the piston rod is reciprocatingly movable relative to the cylinder. The piston rods extend in a radially inward direction toward the disk receiving opening. The support flanges are rigidly connected to the cylinder and extendible into the disk receiving opening for supporting the stack of optical disks. The clamp blocks are connected to a distal end of the piston rod and have an inwardly extending lip which has an edge engaging surface and a stack support surface. The clamp blocks are positioned relative to the support flange so that the edge engaging surface of the clamp blocks are abuttingly engagable with a portion of the outer peripheral edge of the optical disk positioned at the bottom of the stack of optical disks and supported by the support flange upon movement of the clamp blocks to a disk engaging position.

The springs resiliently bias the cylinders and the support flanges in a radial inward direction such that the support flanges extend into the disk receiving opening a distance sufficient to support the stack of optical disks when the edge engaging surfaces of the clamp block is in a non-engaging relationship relative to the outer peripheral edge of the bottom optical disk. The springs additionally permit the cylinders and the support flanges to slide in a radial outward direction such that the support flanges are moved to a non-supporting position relative to the stack of optical disks upon movement of the clamp blocks to the disk engaging position wherein the edge engaging surfaces of the clamp blocks are caused to abuttingly engage a portion of the outer peripheral edge of the bottom optical disk so as to compressibly deform the bottom optical disk and thereby cause the bottom optical disk to be discharged from the stack while the stack support surfaces of the clamp blocks is maintained in a position beneath at least a portion of the adjacently disposed optical disk to support the remainder of the stack of optical disks.

The objects, features and advantages of the present invention will become apparent from the following detailed description when read in conjunction with the accompanying drawings and appended claims.

DETAILED DESCRIPTION OF THE INVENTION

Figure 1:
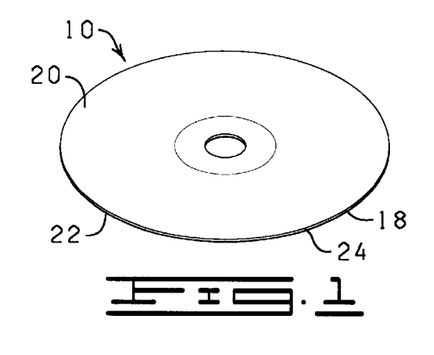
FIG. 1 is a perspective view of an optical disk.

Referring now to the drawings, and more particularly to FIG. 1, shown therein is an optical disk 10. "Optical disk" as used herein means any storage medium that holds information in the form of a pattern of marks on a platter. Examples of optical disks include CD, CD-ROM, CD-R, WORM, DVD, and DVD-ROM. The optical disk 10 generally includes a clear plastic base 18 into which information is impressed in or otherwise formed on one side thereof. The base 18 includes a pair of parallel, planar surfaces 20 and 22, and an outer peripheral edge 24. A reflective layer, typically aluminum, is applied to the one of the planar surfaces 20 or 22 of the base 18 and the reflective layer is covered with a lacquer coating for protection.

Figure 1A:
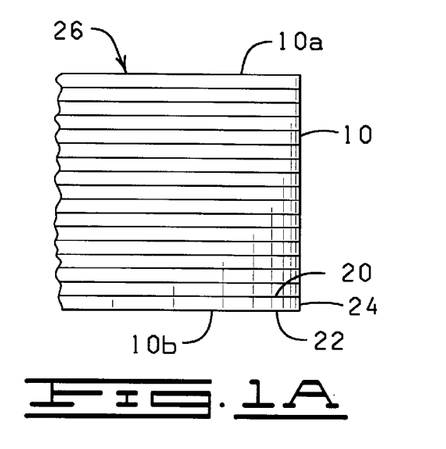
FIG. 1A is a fragmental, side elevational view of a stack of optical disks.

FIG. 1A depicts a portion of a plurality of optical disks 10 aligned and arranged in a stack 26. The stack 26 includes a top disk 10a and a bottom disk 10b. As best illustrate in FIG. 1A, the outer peripheral edge 24 of each optical disk 10 extends between the planar surfaces 20 and 22 in a substantially perpendicular relationship relative thereto. As such, when the optical disks 10 are aligned and stacked as shown in FIG. 1A, there is no readily accessible space provided between adjacent optical disks 10 along the periphery of the optical disks 10 into which a wedge can be accurately inserted to separate adjacent optical disks.

Figure 2:
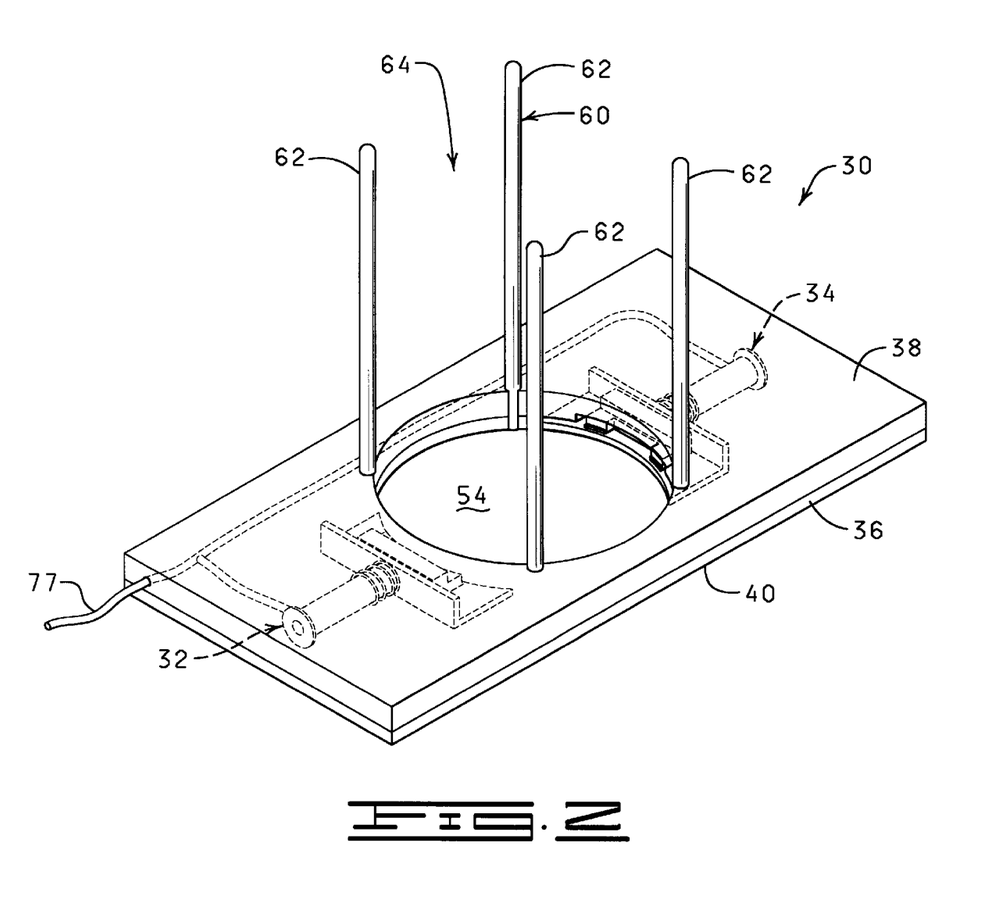
FIG. 2 is a partially cutaway, perspective view of a singulating apparatus constructed in accordance with the present invention.

Referring now to FIG. 2, shown therein is a disk singulating apparatus 30 constructed in accordance with the present invention. The disk singulating apparatus 30 is particularly well adapted for separating or discharging an optical disk from the bottom of a stack of aligned optical disks, such as the stack 26 illustrated in FIG. 1A. The disk singulating apparatus 30 includes a pair of feed gate subassemblies 32 and 34 (shown in phantom) supported in a housing 36 in a spaced apart, diametrically opposing relationship.

Figure 3A:
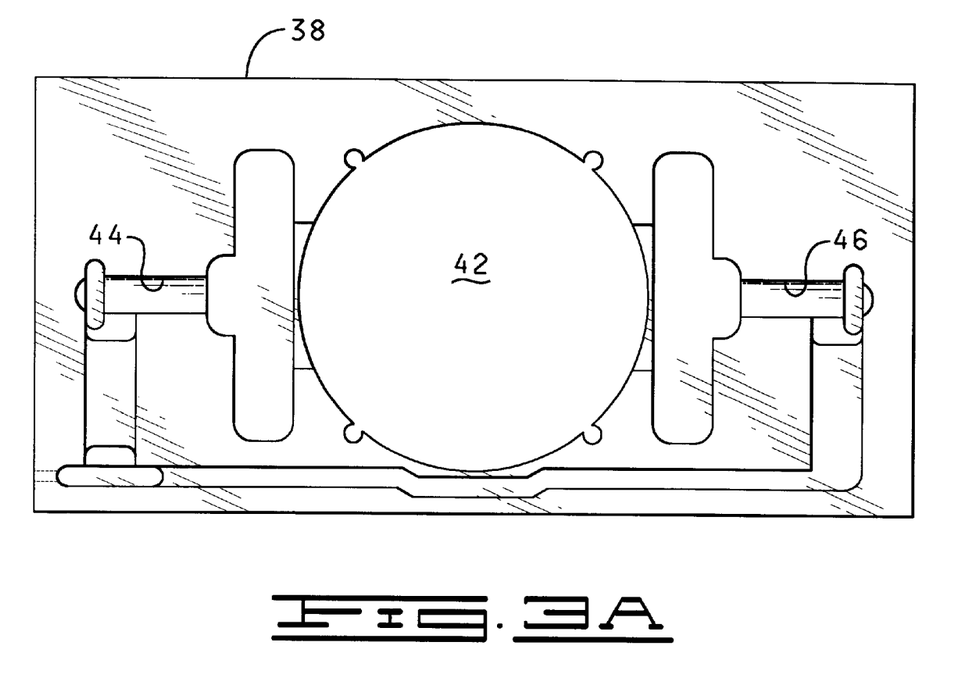
FIG. 3A is a plan view of the bottom side of an upper portion of the housing.
Figure 3B:
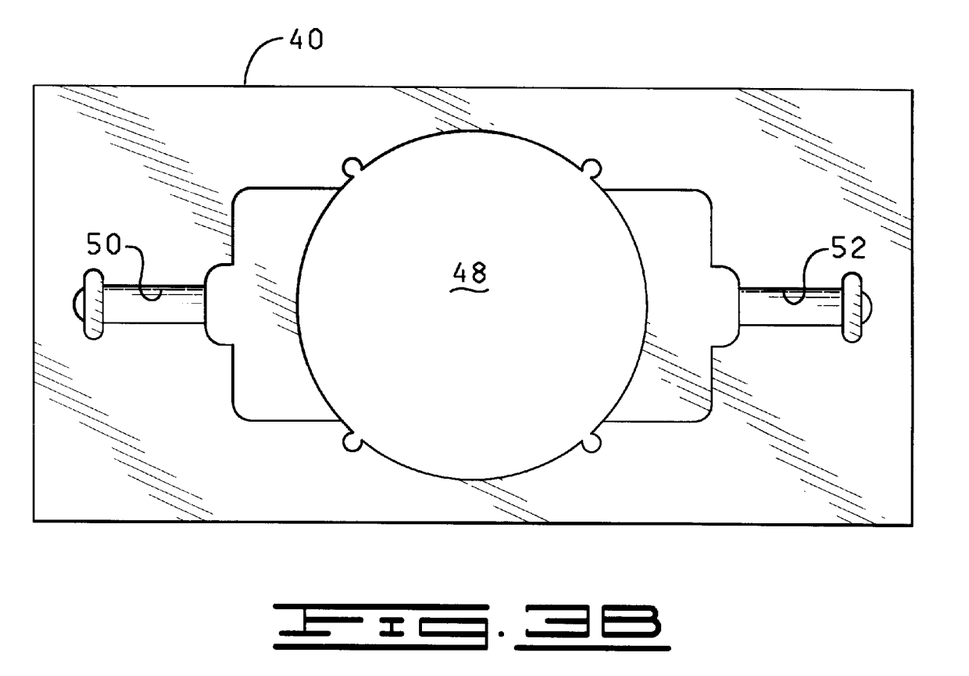
FIG. 3B is a plan view of the top side of a bottom portion of the housing.
Figure 4:
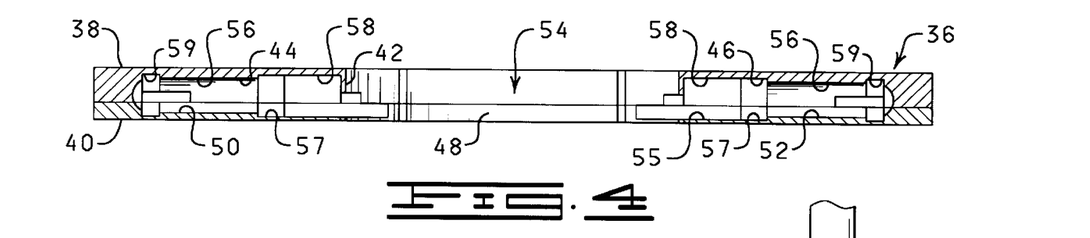
FIG. 4 is a cross-sectional view of the housing.

With reference to FIGS. 2–4, the housing 36 includes a first portion 38 and a second portion 40. The first portion 38 is a plate member having an opening 42 formed therethrough and a pair of diametrically opposed recesses 44 and 46 formed on one side thereof. Likewise, the second portion 40 is a plate member having an opening 48 formed therethrough and a pair of diametrically opposed recesses 50 and 52 formed on one side thereof.

As illustrated in FIG. 4, the first and second portions 38 and 40 are secured together with the openings 42 and 48 aligned with each other to form a disk receiving opening 54 and the recesses 44 and 46 of the first portion 38 superimposed on the recesses 50 and 52 of the second portion 40 to form a cavity 55 which is in open communication with the disk receiving opening 54. Each side of the cavity 55 has a bore portion 56, a counter bore portion 57, an enlarged inner portion 58, and an enlarged outer portion 59. The diameter of the disk receiving opening 54 is sufficient to permit an optical disk to pass freely therethrough.

As shown in FIG. 2, a rack assembly 60 is mounted to the housing 36 for guiding a stack of optical disks into and through the disk receiving opening 54 of the housing 36. The rack assembly 60 is shown herein to include a plurality of support rods 62 mounted to the housing 36 about the periphery of the disk receiving opening 54 to define a disk feed channel 64.

In use, a stack of optical disks, such as the stack 26, is loaded into the disk feed channel 64 and supported in the disk receiving opening 54 of the housing 36 by the feed gate subassemblies 32 and 34 which are supported in the cavity 55 of the housing 36 on diametrically opposing sides of the disk receiving opening 54. In addition to supporting the stack of optical disks, the function of the feed gate subassemblies 32 and 34 is to release or discharge the optical disks from the bottom of the stack one at a time. The feed gate subassemblies 32 and 34 assure that only a single disk will be discharged from the stack at one time, while the remainder of the disks in the stack remain supported and in position so that upon the release of the bottom disk, the next disk in the stack, which is now the bottom disk, is in position to be released in accordance with a programmed sequencing.

Figure 5:
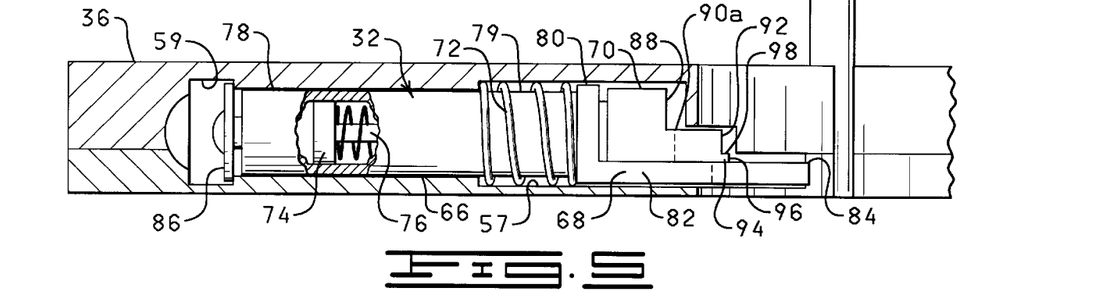
FIG. 5 is a partially cutaway, side elevational view of one of the feed gate subassemblies.
Figure 6:
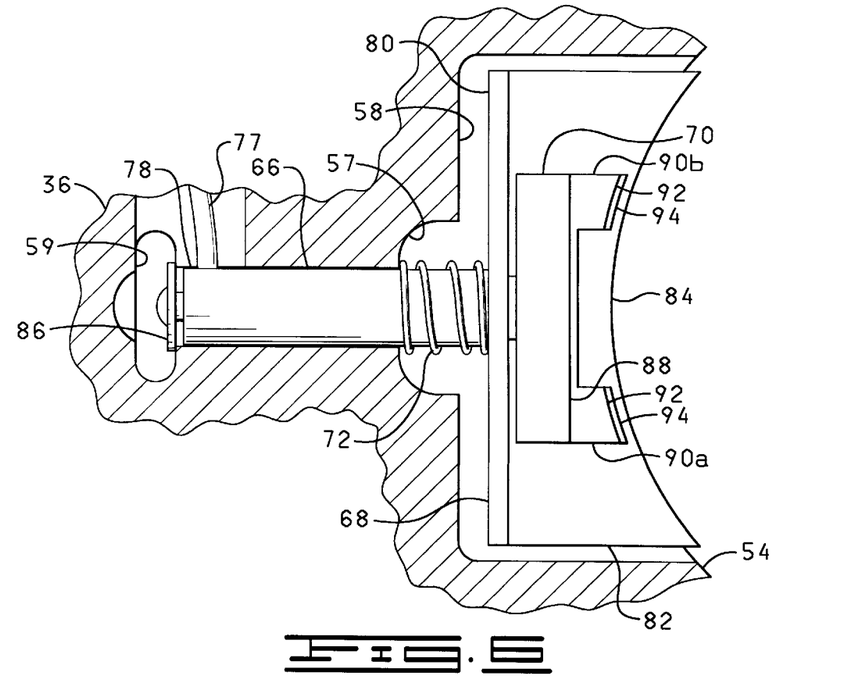
FIG. 6 is a partially cutaway, top view of the feed gate subassembly of FIG. 5.

FIG. 5 is a partially cutaway, side elevational view of the feed gate subassembly 32 supported in the housing 36, and FIG. 6 is a top view of the feed gate subassembly 32. The feed gate subassemblies 32 and 34 are identical in construction and operation. Thus, only the feed gate subassembly 32 will be described in detail hereinbelow with reference to FIGS. 5 and 6.

The feed gate subassembly 32 comprises a cylinder 66, a support plate 68, a clamp block 70, and a spring 72. The cylinder 66 is preferably a single-acting, pneumatic cylinder of conventional design with an internal piston 74 which selectively extends and retracts a piston rod 76 when attached to a controlled pressurized air supply (not shown) at an end 78 of the cylinder 66 via a conduit 77 (FIGS. 2 and 6). The cylinder 66 is slidably disposed in the bore portion 56 (FIG. 4) and the counter bore portion 57 of the cavity 55 of the housing 36. The piston rod 76 extends from an end 79 of the cylinder 66 in a radially inward direction toward the disk receiving opening 54.

It should be noted that while the cylinder 66 is preferably pneumatically actuated, other types of actuation, including hydraulic and electrical, can be employed, but are less preferred. It should also be noted that while the cylinder 66 is preferably supported in the housing 36 described above, the cylinder 66 could alternatively be slidably supported in a cylinder block in a manner disclosed in U.S. Pat. No. 5,050,023, issued on Sep. 17, 1991, to H. D. Ashby, which is hereby incorporated herein by reference.

The support plate 68 is an L-shape member having a connecting flange 80 and a support flange 82. The connecting flange 80 is rigidly secured to the end 79 of the cylinder 66 whereby the piston 74 and the piston rod 76 are reciprocatingly movable relative to the cylinder 66 and the support plate 68. The support flange 82 has an arcuate peripheral edge 84, which is configured to conform to the contour of a portion of the outer peripheral edge 24 of the optical disk 10 (FIG. 1). The support plate 68 is slidably disposed in the enlarged inner portion 58 (FIGS. 4 and 6) of the cavity 55 of the housing 36 so as to permit reciprocating movement of the support plate 68 therein. The support flange 82 is extendible into the disk receiving opening 54 for supporting a stack of optical disks such as the stack 26 (FIG. 1A).

The spring 72 is mounted in the counter bore portion 57 of the cavity 55 and extends about the cylinder 66 so that one end of the spring 72 bears against the end of the counter bore portion 57 and the other end of the spring 72 bears against the back side of the connecting flange 80. The resilient bias of the spring 72 tends to bias the support plate 68 and the cylinder 66 radially inward, thereby extending the support flange 82 of the support plate 68 into the disk receiving opening 54 a distance sufficient so that the bottommost disk of a stack of optical disks can rest on the arcuate peripheral edge 84 of the support plate 68 when the stack is positioned in the optical disk receiving opening 54 of the housing 36. Inward movement of the cylinder 66 and the support plate 68 is arrested by a stop member 86, such as a washer which is secured to the end 78 of the cylinder 66 and sized to engage the end of enlarged outer portion 59 of the cavity 55 extending about the end of the bore portion 56. The stop member 86 is reciprocatingly movable within the enlarged outer portion 59 of the cavity 55.

The clamp block 70 is connected to the distal end of the piston rod 76 and is slidably disposed on the support flange 82 of the support plate 68. The clamp block 70 is preferably constructed of a low friction material, such as polyethylene, to reduce the friction between the clamp block 70 and the support flange 82 of the support plate 68 when the clamp block 70 and the support plate 68 are moved relative to one another and to facilitate the discharge of optical disks in a manner to be described in detail below. The clamp block 70 has a planar surface 88 and a pair of spaced apart lower protrusions 90a and 90b. Each protrusion 90a and 90b has an arcuate surface 92 and a lip 94 extending therefrom. Each lip 94 has an edge engaging surface 96 and a stack support surface 98.

As best shown in FIG. 6, the edge engaging surfaces 96 of the lips 94 have an arcuate configuration which is conformable to the contour of the outer peripheral edge of optical disks. The height of the edge engaging surfaces 96 is less than the thickness of an optical disk whereby the edge engaging surfaces 96 are dimensioned for abutting engagement with the outer peripheral edge of a single optical disk. More specifically, the lips 94 of the clamp block 70 are positioned adjacent to the upper surface of the support flange 82 of the support plate 68 whereby the edge engaging surfaces 96 of the clamp block 70 are abuttingly engagable with a portion of the outer peripheral edge of the optical disk supported on the arcuate peripheral edge 84 of the support flange 82.

The sequential operation of the disk singulating apparatus 30 will now be described in further detail with reference to FIGS. 7A–7D. First, the stack 26 of optical disks 10 is placed into the disk feed channel 64 formed by the support rods 62. The support rods 62 function in cooperation with the feed gate subassemblies 32 and 34 to retain the optical disks 10 in a neat stack with the outer peripheral edges 24 of the optical disks 10 aligned. The optical disks 10 are urged by gravity toward the disk receiving opening 54 of the housing 36 where further gravitation is prevented by the interposition of the feed gate subassemblies 32 and 34. In particular, the springs 72 of the feed gate subassemblies 32 and 34 bias the cylinders 66 and the support plates 68 in a radially inward direction such that a portion of the support flange 82 of the support plates 68 extends into the disk receiving opening 54 a distance sufficient to support the stack of optical disks.

To discharge the bottom disk 10b from the stack 26, the cylinders 66 are simultaneously pressurized to actuate the piston 74 and the piston rod 76 (FIG. 5) in a radially inward direction so as to cause the clamp blocks 70 to move to a disk engaging position (FIG. 7B) wherein the edge engaging surfaces 96 of the clamp blocks 70 are caused to abuttingly engage a portion of the outer peripheral edge 24 of the bottom optical disk 10b, which is supported by the arcuate peripheral edge 84 of the support plate 68.

Figure 7A:
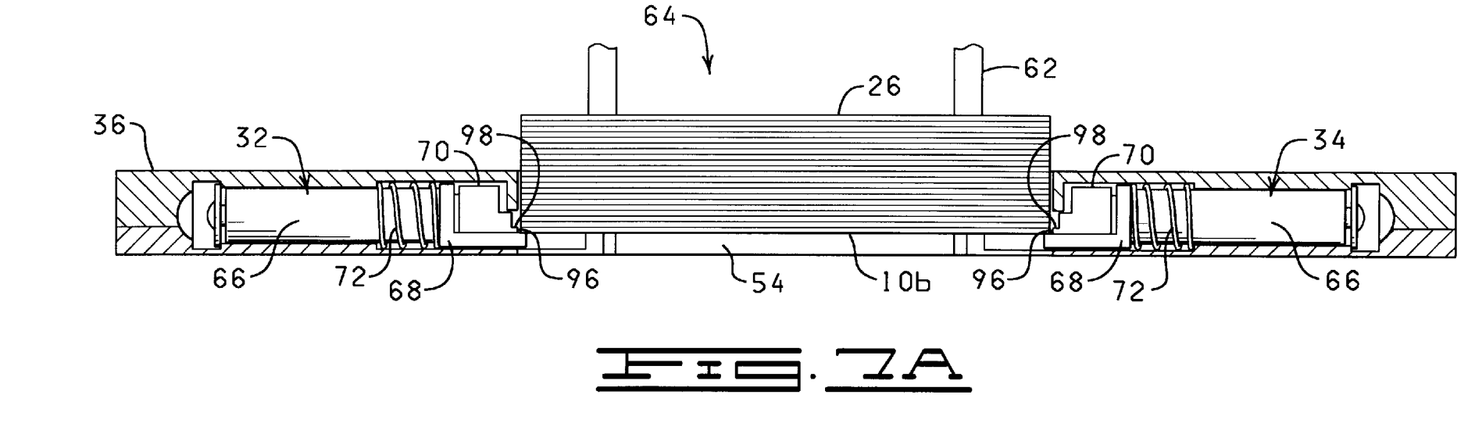
FIGS. 7A–7D are partial cutaway, side elevational views of the singulating apparatus of the present invention illustrating the sequential operation of the singulating apparatus in discharging an optical disk from the bottom of a stack of optical disks.
Figure 7B:
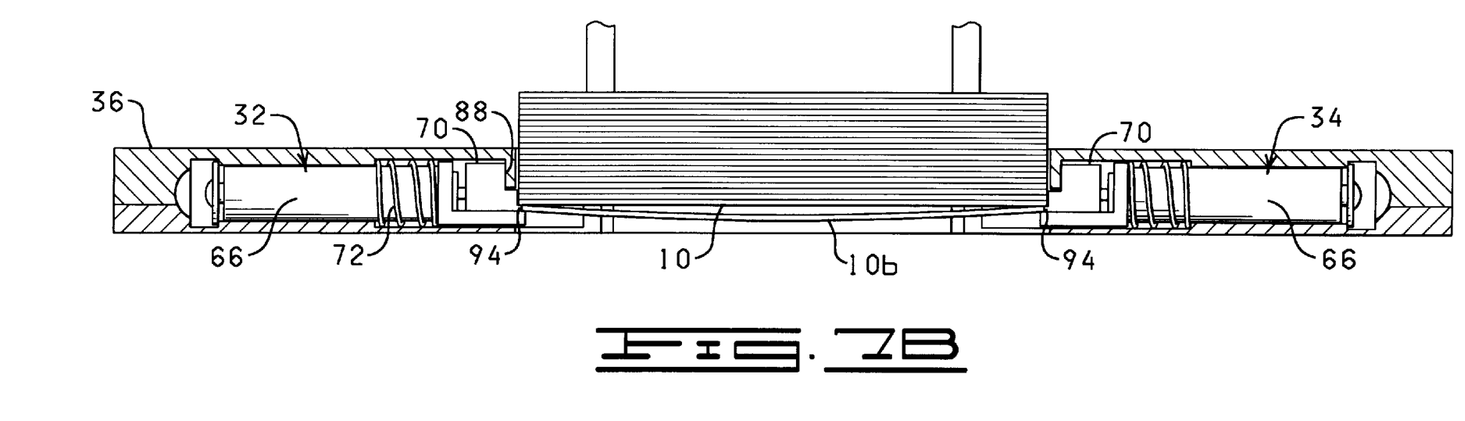

As previously mentioned, one of the advantages of optical disks is their durability. This durability is due in part to the fact that optical disk have a plastic base which has an elastic quality that permits the base to be bent when a force is applied to its peripheral edge and to spring back to its original form upon removal of the force. As will become apparent below, it is the elasticity of an optical disk that the present invention relies on in order to effectively discharge an optical disk from the bottom of a stack. That is, upon the edge engaging surfaces 96 of the clamp blocks 70 engaging opposing portions of the outer peripheral edge 24 of the bottom optical disk 10b, the clamp blocks 70 continue to move radially inward whereby the clamp blocks 70 of the feed gate subassemblies 32 and 34 cooperate to apply a compressive force on the optical disk 10b so as to cause the optical disk 10b to bow slightly in a downward direction, as illustrated in FIG. 7B. The bowing of the optical disk 10b enables the edge engaging surfaces 96 of each of the clamp blocks 70 to extend inwardly beyond the outer peripheral edge 24 of the adjacent optical disk 10 whereby the stack support surfaces 98 of the clamp blocks 70 are caused to be positioned beneath a portion of the adjacently disposed optical disk 10.

Figure 7C:
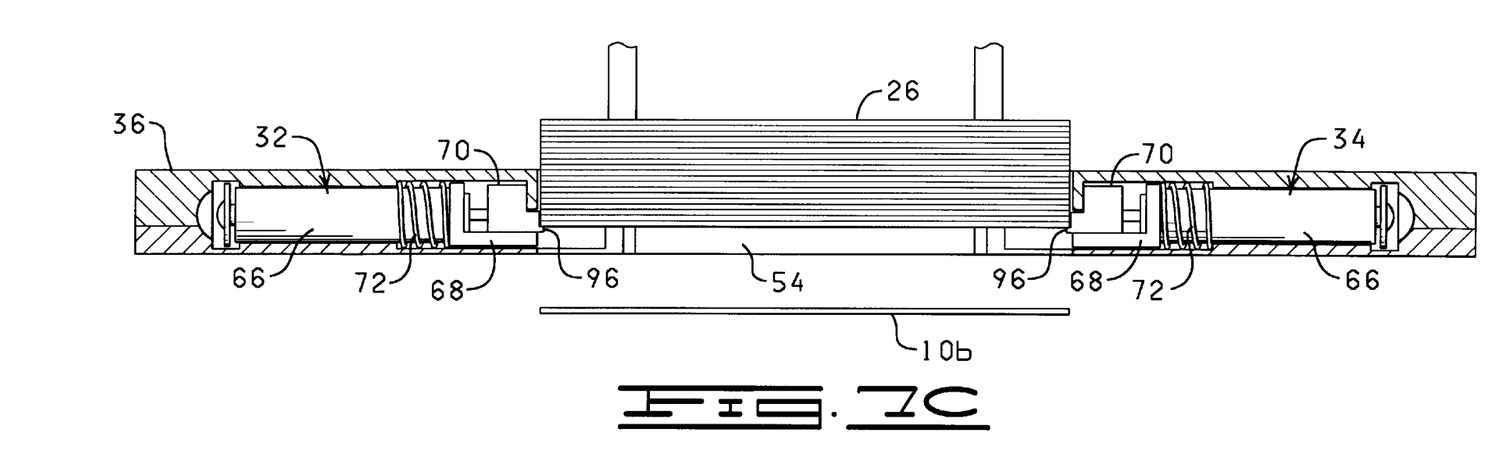

With the clamp blocks 70 extended inwardly to slightly bow the bottom disk 10b and to position the stack support surfaces 98 beneath the adjacent optical disk, the planar surface 88 of the clamp blocks 70 engages an inward surface of the housing 36. Engagement of the planar surface 88 of the clamp blocks 70 with the inward surface prevents further inward movement of the clamp blocks 70. Thus, the cylinders 66 are forced to slide in a radial outward direction within the bore portion 56 of the cavity 55 in reaction to the continued application of fluid pressure on the piston 74, as illustrated by FIG. 7C. As a result of the cylinders 66 moving in an outward direction, the support plates 68, which are connected to the cylinders 66, are retracted from the disk receiving opening 54 of the housing 36 such that the support plates 68 are moved to a non-supporting position relative to the bottom optical disk 10b.

Upon the support plates 68 being retracted to the non-supporting position, as shown in FIG. 7C, the compressed optical disk 10b is allowed to be discharged from its position at the bottom of the stack 26. The elasticity of the optical disk in combination with the low friction engagement between the edge engaging surfaces 96 and the outer peripheral edge 24 of the optical disk 10b, causes the optical disk lob to slide off of the edge engaging surfaces 96 of the clamp blocks 70 and gravitate away from the stack 26.

Figure 7D:
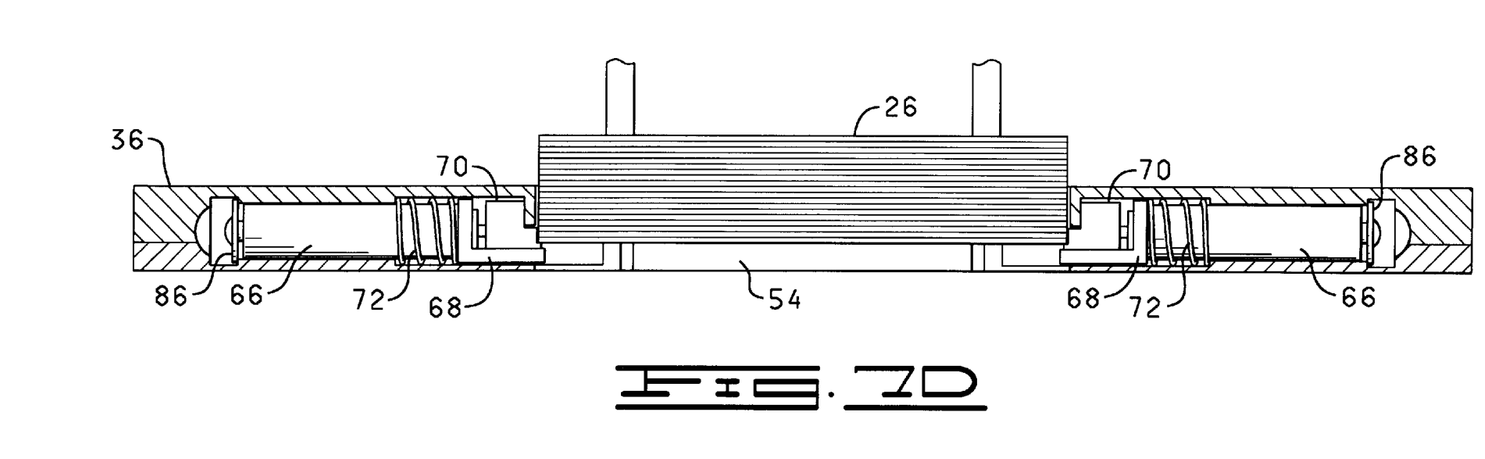

After a control device (not shown) which controls the charging of the actuating fluid to each of the cylinders 66 has timed out, the cylinders 66 are depressurized. In response, each cylinder 66 slides in a radially inward direction due to the bias of the springs 72 until the stop members 86 arrest the cylinders 66 further movement. At this point, the support flanges 82 of the support plates 68 will again be positioned in the disk receiving opening 54 in a disk supporting position (FIG. 7D).

With the cylinders 66 arrested by the stop members 86, the pistons 74 and the piston rods 76 will retract and thus cause a retraction the clamp blocks 70. The retraction of the clamp blocks 70 results in the retraction of the stack support surfaces 98 out of engagement with the stack 26 of optical disks thereby causing the stack 26 of optical disks to gravitate downwardly onto the two opposed support plates 68 (as depicted in FIG. 7A) where the next optical disk is ready for discharge from the stack.

It will be appreciated that the control device (not shown) for operating the cylinders 66 is of conventional design with pneumatic or electronic controls to sequentially operate the cylinders 66, and thus need not be described in detail herein in that sequential control circuitry is well known to persons of ordinary skill in this art and related arts. It will also be appreciated that the present invention does not require such sophistication of control circuitry, and can be used with simple sequencing control, including the use of conventional, manually operated switches.

Figure 8:
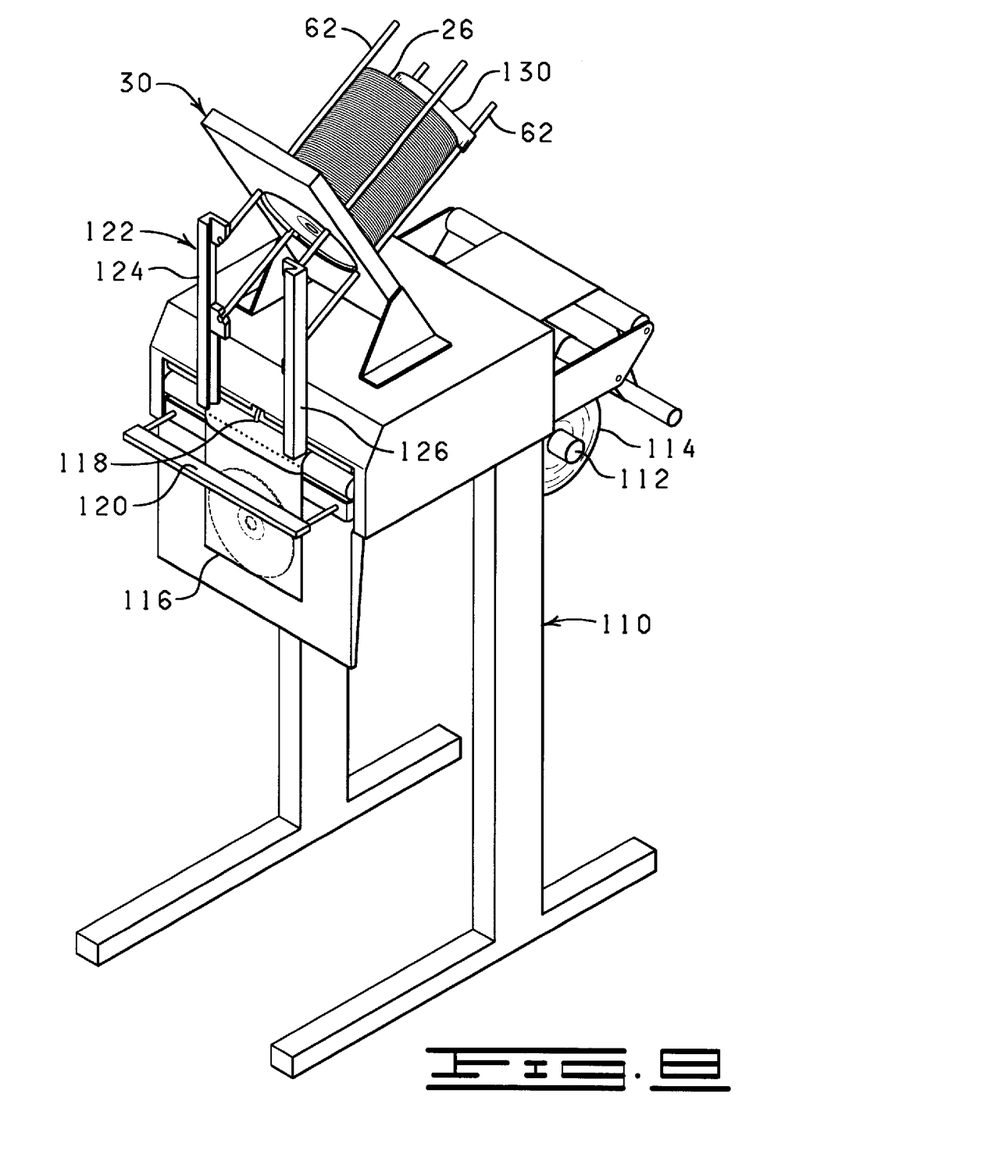
FIG. 8 is a perspective view of the singulating apparatus of the present invention shown incorporated with a bagging machine.
Figure 9:
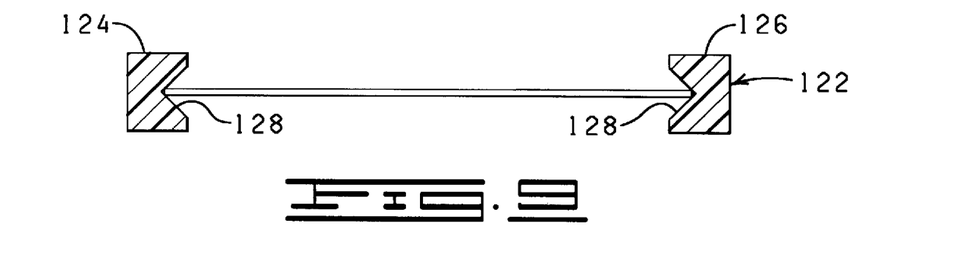
FIG. 9 is a cross-sectional representation of a pair of side rails showing an optical disk disposed therebetween.

The disk singulating apparatus 30 described above is intended for automatically feeding optical disks to various types of optical disk production equipment. For example, the disk singulating apparatus 30 can be employed to feed optical disks to duplication equipment, packaging equipment, labeling equipment, printing equipment, or an inspection station. FIG. 8 illustrates the disk singulating apparatus 30 mounted to a conventional bagging machine 110. Bagging machines are well known in the art. An example of such a bagging machine is the model sold by Allied Automation, Inc., Dallas, Tex. 75244 as its Model No. 6500. A brief description of the bagging machine 110, together with the modifications thereto required for the present invention, is believed adequate for an understanding of the present invention. The bagging machine 110 has a roller 112 for supporting a roll of plastic bags 114. The bags are pulled off of the roller 112 and through the bagging machine 110 until a lead bag 116 is supported in a loading position. With the bag 116 in the loading position, a bag opening assembly 118 blows compressed air at the bag opening to open the bag 116 and permit the bag 116 to be filled. When the bag 116 is filled with product, a heated seal bar 120 is caused to be drawn into contact with the upper end of the bag 116 to close and seal the bag 116. With the bag 116 sealed, the heated seal bar 120 is pivoted down to tear the sealed bag from an adjacent bag and allow the bag 116 to drop into a receiving bin (not shown).

To feed an optical disk into the lead bag 116, the disk singulating apparatus 30 is mounted to the top end of the bagging machine 110, as substantially shown. A guide assembly 122 is provided between the disk singulating apparatus 30 and the loading position of the bagging machine 110 to guide the optical disk discharged from the disk singulating apparatus 30 into the open bag 116. The guide assembly 122 may comprise a pair of parallel side rails 124 and 126, each having a groove 128 (shown in FIG. 8). The support rods 62 of the rack assembly 60 are extended through the housing 36 to support the stack of optical disks and to guide the discharged optical disks into engagement with the side rails 124 and 126. A disk follower 130 is slidably attached to the support rods 62 to maintain the optical disks in alignment with the disk singulating apparatus 30. To prevent the formation of scratches in the optical disk as it is traveling along the side rails 124 and 126, the grooves 128 can be formed to have a substantially V-shaped configuration, as illustrated in FIG. 8, whereby only a small portion of an optical disk gravitating through the guide assembly 122 will actually be in contact with the side rails 124 and 126. To coordinate the operation of the disk singulating apparatus 30 and the bagging machine 110, the control device (not shown) of the disk singulating apparatus 30 is interfaced with the control device of the bagging machine 110 in a manner well known in the art.

While the singulating apparatus of the present invention has been described for discharging an optical disk from the bottom of a stack of optical disks, it should be understood that the invention is not limited to the use of optical disks, but rather can be utilized for discharging any disk from the bottom of a stack of disks wherein the disk has sufficient flexibility to permit effective operation of the singulating apparatus. For example, the disk could be a magnetic disk and, as long as such magnetic disk contained the sufficient flexibility to allow the operation of the singulating apparatus in the manner hereinbefore described, such disk is considered to be within the scope of the present invention and the use of the singulating apparatus for discharging such disk from the bottom of a stack of disks.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for discharging a disk from a stack of aligned disks, each disk having a pair of parallel, planar surfaces and an outer peripheral edge, the apparatus comprising:

a pair of feed gate subassemblies supported in a spaced apart, diametrically opposing relationship so as to define a disk receiving opening therebetween, the feed gate subassemblies adapted to cooperatively support the stack of disks in the disk receiving opening and compressively engage at least a portion of the outer peripheral edge of the disk positioned at the bottom of the stack of disks to permit discharge of the bottom disk from the stack of disks, each feed gate subassembly comprising:

a cylinder having a piston slidably disposed therein so as to be adapted for reciprocating movement relative to the cylinder;

a piston rod having one end connected to the piston so that the piston rod is reciprocatingly movable relative to the cylinder, the piston rod extending in a radially inward direction toward the disk receiving opening;

a support flange rigidly connected to the cylinder, the support flange extendible into the disk receiving opening for supporting the stack of disks;

a clamp block connected to a distal end of the piston rod and having an inwardly extending lip, the lip having an edge engaging surface and a stack support surface, the clamp block positioned relative to the support flange so that the edge engaging surface of the clamp plate is abuttingly engagable with a portion of the outer peripheral edge of the disk positioned at the bottom of the stack of disks and supported by the support flange upon movement of the clamp block to a disk engaging position; and means for resiliently biasing the cylinder and the support flange in a radial inward direction such that the support flange extends into the disk receiving opening a distance sufficient to support the stack of disks when the edge engaging surface of the clamp block is in a non-engaging relationship relative to the outer peripheral edge of the bottom disk and for permitting the cylinder and the support flange to slide in a radial outward direction such that the support flange is moved to a non-supporting position relative to the stack of disks upon movement of the clamp block to the disk engaging position wherein the edge engaging surface of the clamp block is caused to abuttingly engage a portion of the outer peripheral edge of the bottom disk so as to compressibly deform the bottom disk and thereby cause the bottom disk to be discharged from the stack while the stack support surface of the clamp block is maintained in a position beneath at least a portion of the adjacently disposed disk to support the remainder of the stack of disks.

2. The apparatus of claim 1 wherein the edge engaging surface of the clamp block of each of the feed gate subassemblies is configured to conform to the contour of the outer peripheral edge of the disks.

3. The apparatus of claim 2 wherein the edge engaging surface has an arcuate shape.

4. An apparatus for discharging a disk from a stack of aligned disks, each disk having a pair of parallel, planar surfaces and an outer peripheral edge, the apparatus comprising:

a housing having a first portion and a spatially disposed second portion, the first and second portions defining a cavity therebetween and the first portion and the second portions having a disk receiving opening extending therethrough in open communication with the cavity of the housing; and a pair of feed gate subassemblies disposed in the cavity of the housing on diametrically opposing sides of the disk receiving opening, the feed gate subassemblies adapted to cooperatively support the stack of disks in the disk receiving opening of the housing and compressively engage at least a portion of the outer peripheral edge of the disk positioned at the bottom of the stack of disks to permit discharge of the bottom disk from the stack of disks, each feed gate subassembly comprising:

a cylinder slidably disposed in the cavity of the housing, the cylinder having a piston slidably disposed therein so as to be adapted for reciprocating movement relative to the cylinder;

a piston rod having one end connected to the piston so that the piston rod is reciprocatingly movable relative to the cylinder, the piston rod extending in a radially inward direction toward the disk receiving opening;

a support flange rigidly connected to the cylinder, the support flange extendible into the disk receiving opening for supporting the stack of disks;

a clamp block connected to a distal end of the piston rod and having an inwardly extending lip, the lip having an edge engaging surface and a stack support surface, the clamp block positioned relative to the support flange so that the edge engaging surface of the clamp block is abuttingly engagable with a portion of the outer peripheral edge of the disk positioned at the bottom of the stack of disks and supported by the support flange upon movement of the clamp block to a disk engaging position; and means for resiliently biasing the cylinder and the support flange in a radial inward direction such that the support flange extends into the disk receiving opening a distance sufficient to support the stack of disks when the edge engaging surface of the clamp block is in a non-engaging relationship relative to the outer peripheral edge of the bottom disk and for permitting the cylinder and the support flange to slide in a radial outward direction such that the support flange is moved to a non-supporting position relative to the stack of disks upon movement of the clamp block to the disk engaging position wherein the edge engaging surface of the clamp block is caused to abuttingly engage a portion of the outer peripheral edge of the bottom disk so as to compressibly deform the disk and thereby cause the bottom disk to be discharged from the stack while the stack support surface is maintained in a position beneath at least a portion of the adjacently disposed disk to support the remainder of the stack of disks.

5. The apparatus of claim 4 wherein the edge engaging surface of the clamp block of each of the feed gate subassemblies is configured to conform to the contour of the outer peripheral edge of the disks.

6. The apparatus of claim 5 wherein the edge engaging surface of the clamp block has an arcuate shape.

* * * * *